UNITED STATES PATENT OFFICE.

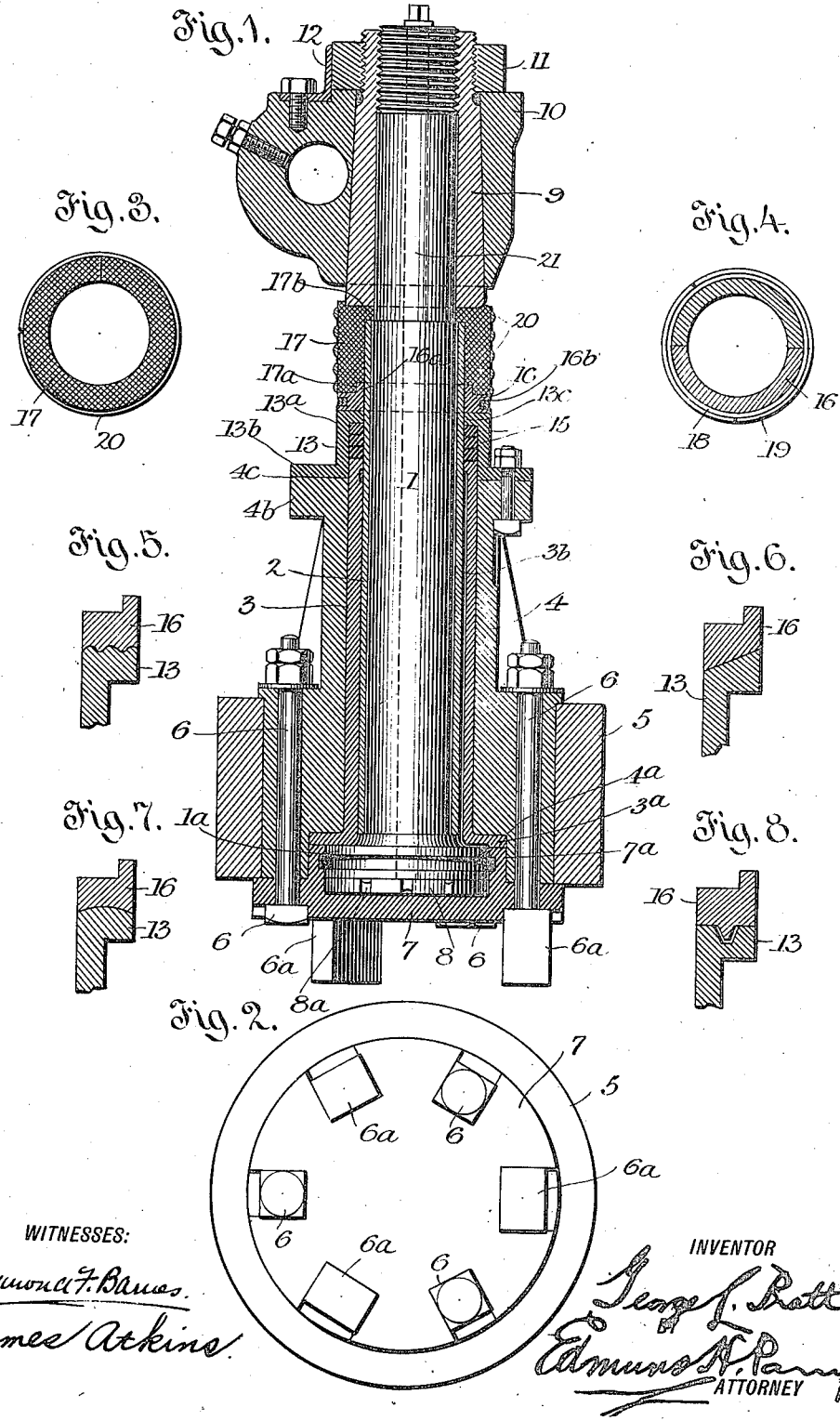

GEORGE L. PRATT, OF ATLANTA, GEORGIA.

BEARING FOR SHAFTS, SPINDLES, AND THE LIKE.

1,204,063.

Specification of Letters Patent.

Patented Nov. 7, 1916.

Application filed January 30, 1912. Serial No. 674,391.

*To all whom it may concern:*

Be it known that I, GEORGE L. PRATT, a citizen of the United States, residing at Atlanta, in the county of Fulton and State of Georgia, have invented certain new and useful Improvements in Bearings for Shafts, Spindles, and the like, of which the following is a specification, reference being had therein to the accompanying drawing.

This invention relates to dust-proof bearings, and particularly contemplates a construction which is adapted for use in pulverizer-rolls.

It is the object of my invention to provide in such a machine means to maintain the bearing faces or surfaces in such intimate contact at all times and under all conditions of operation that the entrance of dust, etc., is precluded.

It is also an object of my invention to simplify the construction of the parts in order that, should replacement be necessary, it can quickly and conveniently be accomplished, and without requiring the stopping of the pulverizing machine for any extended time.

With these and other objects in view, the invention resides in the novel construction, combination and relative aggroupment of the parts, all as more fully explained and claimed hereinafter.

In the accompanying drawings, I have illustrated some of the embodiments of my invention and these will suffice to indicate, first, the underlying principle of my invention, and, secondly, the various forms in which the invention may be embodied. It is to be understood that I do not limit myself to the details of construction nor to the precise forms of the parts, since these may be varied to a considerable degree and yet be within the spirit of the invention.

In these drawings: Figure 1 is a view in vertical section of a portion of a pulverizer roll; Fig. 2 is a view in bottom plan thereof; Fig. 3 is a detail view of a resilient collar-holding member forming a part of my improved bearing; Fig. 4 is a view in cross-section of said collar and showing a plurality of split-rings which embrace it; Figs. 5, 6, 7 and 8 are fragmentary views showing some of the many possible forms of contacting surfaces with which said collar may be provided.

Referring to the drawings: The numeral 1 designates a shaft or spindle upon which my improved dust-proof bearing is adapted to be mounted. This shaft or spindle may be that which forms an essential part of a pulverizer roll. In this instance, the shaft is preferably made of machined steel.

Surrounding the shaft for a portion of its length is a preferably cold-drawn steel sleeve 2 which is shrunk onto the shaft and serves as the active wearing surface for said shaft and whereby the latter is protected from wear. By reason of the high cost of the shaft, and the expense of replacing it after becoming worn, I have found it desirable to surround the shaft with the replaceable sleeve. It is to be understood that I may omit the sleeve and, then, the shaft would provide its own wearing surface. Surrounding said sleeve for a portion of its length, is a roll-bushing 3, preferably made of bronze. It will be understood that this bushing has a rotative movement upon the sleeve, or upon the shaft when the sleeve is omitted. The lower end of the bushing 3 is turned outwardly to provide a flange $3^a$; and, in the bore of the bushing is provided an oil-groove $3^b$.

Embracing the bushing is a tubular element 4, preferably made of cast iron. This tubular element is enlarged at its lower portion, as shown, to provide a support for a roll-member 5. The bore of the tubular element is offset, at $4^a$, and into this offset the flange $3^a$ of the bushing is adapted to fit.

Secured (as by bolts 6, 6) or otherwise clamped to the lower end of the roll-core is a bottom-plate 7 which, as shown, is provided with an upwardly extending portion $7^a$, the upper edge of which engages the lower face of the flange $3^a$. This bottom-plate is chambered, as shown, to form a housing for the head $1^a$ of the shaft.

It will be observed that some of the bolts 6 have elongated heads $6^a$, whereby they serve as plow-bolts.

Underlying the head $1^a$ of the shaft and also housed therewith in the chambered portion of the bottom-plate 7 is a friction-disk 8, the periphery of which is provided with oil-recesses $8^a$, as shown.

Surrounding the upper end of the shaft 1 is a tapered bushing 9, the same being threaded onto the shaft, as shown; and upon this bushing is mounted a trunnion-head 10, the same being firmly secured to the bushing by means of the lock-nut 11 which is screwed onto the threaded end of the bushing 9. To prevent said lock-nut from working loose, a nut-lock 12 is secured to the trunnion and has an angular extension which engages the face of the nut.

As illustrated in Fig. 1, the upper end of the roll-core 4 is provided with a flange 4$^b$ having an extended contacting surface 4$^c$. Bolted or otherwise secured to said flanged portion of the roll-core 4 is a gland-member 13, the same comprising a body-portion 13$^a$, an angulated portion 13$^b$ adapted to bear against the contacting surface 4$^c$ of the roll-core, and an inwardly projecting flange 13$^c$. As shown, the lower end of the body-portion 13$^a$ embraces the upper extremity of the bushing 3, while the flanged portion 13$^c$ embraces the shaft sleeve 2. Disposed in the space or chamber formed by body-portion 13$^a$, the upper end of the bushing 3, and the flange 13$^c$, are a plurality of fiber-rings 15, or the like.

Immediately above the gland-member 13 and adapted to have frictional contact therewith is a friction-collar 16 which, as shown, has a bearing-face at its lower end commensurate with the upper surface of the flanged portion 13$^c$ of the gland-member. This friction-collar is yieldingly maintained against said gland-member by holding collar 17 formed of some resilient material and preferably rubber. The upper end of the friction-collar is provided with an upstanding extension 16$^a$ adapted to be seated in a correspondingly-formed annular recess 17$^a$ in the resilient holding collar 17.

The friction-collar is preferably split and formed of bronze and, as shown, has a sliding-fit on the shaft sleeve 2. It is provided with an annular groove 16$^b$ adapted to receive two split snap-rings 18 and 19, the same being so placed on the collar as to break joints therewith and with each other, as illustrated in Fig. 4.

The resilient holding-collar is, as shown in Fig. 3, split longitudinally, and is caused to embrace the sleeve 2 and the friction-collar by reason of its being encircled by a plurality of split-rings 20. Where, as in the form shown in the drawings, said holding-collar is made of rubber, it will firmly grip the upstanding portion 16$^a$ of the friction-collar. Being itself firmly gripped upon the shaft and collar, as shown, it holds itself against any rotative movement. Similarly, by reason of its gripping action upon the friction-collar, its function is to hold the same against any rotative movement and, yet, permit it to have a slight longitudinal movement on the sleeve. In other words, the rubber collar yieldingly maintains the friction-collar against the gland 13. It also serves to prevent the entrance of dust into the bearing at the points where this rubber collar embraces the shaft sleeve. To this end, it is provided with an inwardly extending, annular flange 17$^b$ that tightly encircles the shaft, as shown in Fig. 1.

It will be understood that the shaft 1 and its sleeve 2 are non-rotatable, and similarly are the collars 16 and 17. The gland 13 and roll-core 4 with the roll are rotatable relatively to the shaft. The form and operation of the friction-collar 16 are such that it is maintained constantly against the gland at all times without partaking of any of its rotative movement. In the event that the roll-core runs at all out of true, as a result for instance of wear, the friction-collar will be maintained tightly against the bearing-surface of the gland, and this result follows from the pressure exerted upon said collar by the rubber holding-collar. In this way, no separation, even slight, is permitted by the collar 16 from the gland. In consequence, no dust is permitted entrance at this point.

Oil is supplied to the parts through the oil-duct 21 extending longitudinally through the center of the shaft. The oil feeds therethrough and around the recesses 8$^a$ in the friction-disk 8 and upwardly along the oil-groove 3$^b$.

The washers 15 serve to prevent the oil from working its way out between any of these contacting parts. If any does leak out, it will constitute itself into a vehicle to carry out any dust that may be at the edges. This is due to the fact that the high centrifugal force developed during the operation of the roll will tend to cause an outward tendency of action of any fluid—whether it be air or oil—and this serves further to preclude entrance of dust, etc.

In Figs. 3 to 8 inclusive, I have illustrated various forms of contacting surfaces on the lower end of the friction-collar and the upper end of the gland, and whereby the entrance of dust would ordinarily be prevented. These will serve sufficiently well under ordinary circumstances and provided there has been no substantial wear of the parts whereby play between them may be possible. Under these conditions, however, I prefer to employ the form of flat contacting surfaces illustrated in Fig. 1, for the reason that these flat contacting surfaces will allow a requisite sliding movement of the surfaces on each other necessary to permit them to be maintained in intimate contact, under the pressure-existing influence of the resilient holding-collar 17.

The friction-collar 16 is, as already specified, preferably made of bronze because of its recognized valuable characteristics for such purposes. By reason of its being split, it can conveniently be replaced. To do this, it is only necessary to force the rubber collar away from it, then remove the split-rings 19 and 20, and pull it off. The rubber collar is also conveniently replaceable because it, too, is split and held only by the split-ring 20.

It is obvious that my invention is susceptible of considerable modification. The essential features are the provision in a bearing for shafts, spindles and the like, of a relatively non-rotatable friction member, a contacting member, and means for yieldingly maintaining said friction-member against rotative movement but in intimate contact with said contacting member.

It will of course be manifest that, in some instances, the shaft and its sleeve, with the friction-collar and the specified holding means, may be rotatable and the roll-core and gland be stationary in relation thereto.

Having thus described my invention, the preferred construction and arrangement of the parts, and their mode of operation, what I claim is:

1. A bearing including in combination, a shaft provided with a circumferential shoulder, a friction collar encircling the shaft, a gland member also encircling the shaft and coaxial with said collar and against which the collar is held, and a resilient collar embracing the shaft at the shouldered portion thereof and normally approximating the diameter of the friction collar and gland member for effecting the longitudinal movement of the friction collar into contact with the gland member.

2. A bearing including in combination, a shaft provided with a circumferential shoulder, a relatively non-rotatable friction collar encircling the shaft, a gland member also encircling the shaft and coaxial with said collar and against which the collar is held, and a resilient collar embracing the shaft at the shouldered portion thereof and also embracing a portion of the friction collar and adapted to press the friction collar against the gland member.

3. A bearing including in combination, a shaft provided with a circumferential shoulder, a relatively non-rotatable friction collar encircling the shaft, a gland member also encircling the shaft and coaxial with said collar and against which the collar is held, and a resilient collar embracing the shaft at the shouldered portion thereof and relatively non-rotatable, whereby it holds the friction collar against rotative movement and in intimate engagement with the gland member.

4. A bearing including in combination, a shaft provided with a circumferential shoulder, a gland member encircling the shaft and rotatable about the same, a resilient collar embracing the shaft at the shouldered portion thereof and relatively non-rotatable, and a friction collar interposed between said resilient collar and the gland member and partly embraced by the resilient collar.

5. A bearing including in combination, a shaft provided with a shouldered portion, a core member rotatable about the shaft, a gland member secured to the core member and encircling the shaft, a resilient collar provided with a flange embracing the shaft at the shouldered portion thereof, a friction collar interposed between the resilient collar and the gland member and held by the resilient collar against rotative movement while the gland and core members are rotating about the shaft.

6. A bearing including a shaft, a core member encircling and rotatable about the shaft, a gland member encircling the shaft and attached to the core member and movable therewith, a resilient collar having a flange embracing the shaft at a shouldered portion thereof, and a friction collar interposed between the resilient collar and the gland member and provided with a flange embraced by the resilient collar and held thereby against rotation with the gland member.

7. A bearing for shafts of pulverizer-rolls and the like, including a relatively stationary shaft, a core member encircling and rotatable about the shaft, a gland member encircling the shaft and attached to the core member, a resilient collar embracing the shaft, and a friction collar contacting with the gland member and provided with a flange embraced by the resilient collar and held non-rotatable therewith during the rotative movement of the gland member.

8. A bearing for shafts of pulverizer-rolls and the like, including a shaft provided with a circumferential collar, a core-member encircling and rotatable about the shaft, a gland member secured to the core member and provided with an inwardly extending flange to present a collar-engaging surface, a resilient collar encircling the shaft and provided with an inwardly extending flange which embraces the shaft at the shouldered portion thereof and provided, also, with an annular recess, and a friction collar encircling the shaft and provided with an annular flange seated in the recess in the resilient collar and having a frictional engagement with the collar-engaging surface of the gland member.

In testimony whereof I affix my signature in presence of two witnesses.

GEORGE L. PRATT.

Witnesses:
A. M. PARKINS,
EDMUND H. PARRY.